(12) United States Patent
Yun et al.

(10) Patent No.: US 11,817,962 B2
(45) Date of Patent: Nov. 14, 2023

(54) METHOD FOR INSTANT MESSAGING SERVICE PROVIDING SCHEDULE SERVICE AND APPARATUS THEREOF

(71) Applicant: KAKAO CORP., Jeju-si (KR)

(72) Inventors: Jeong Min Yun, Seongnam-si (KR); Moon Young Jo, Seongnam-si (KR); Yeon Jin Lee, Seongnam-si (KR); Won Chul Jeong, Seongnam-si (KR); Han Byeol Choi, Seongnam-si (KR); Bong Gyun Kang, Seongnam-si (KR); Hyun Na Park, Seongnam-si (KR); Moon Seok Park, Seongnam-si (KR); Pyung Hwa Choi, Seongnam-si (KR); Dae Seong Shin, Seongnam-si (KR); Seung Uk Jeong, Seongnam-si (KR); Hoi Moon Jeong, Seongnam-si (KR); Won Iel Yoo, Seongnam-si (KR); Seo Yon Choi, Seongnam-si (KR)

(73) Assignee: KAKAO CORP., Jeju-si (KR)

(*) Notice: Subject to any disclaimer, the term of this patent is extended or adjusted under 35 U.S.C. 154(b) by 0 days.

(21) Appl. No.: 17/549,868

(22) Filed: Dec. 14, 2021

(65) Prior Publication Data
US 2022/0191054 A1    Jun. 16, 2022

(30) Foreign Application Priority Data
Dec. 14, 2020   (KR) .................. 10-2020-0174801

(51) Int. Cl.
*H04L 12/18* (2006.01)
*H04L 51/046* (2022.01)

(52) U.S. Cl.
CPC ........ *H04L 12/1818* (2013.01); *H04L 51/046* (2013.01)

(58) Field of Classification Search
CPC . H04L 51/046; H04L 12/1813; H04L 41/026; H04L 41/5093; H04L 12/1818
See application file for complete search history.

(56) References Cited

U.S. PATENT DOCUMENTS

| | | | |
|---|---|---|---|
| 9,142,072 B2* | 9/2015 | Ricci | G06F 16/252 |
| 2004/0002049 A1* | 1/2004 | Beavers | H04L 12/1813 |
| | | | 434/350 |
| 2009/0106416 A1* | 4/2009 | Cohen | H04L 12/1818 |
| | | | 709/224 |
| 2015/0046209 A1* | 2/2015 | Choe | G06Q 10/1095 |
| | | | 705/7.19 |

(Continued)

FOREIGN PATENT DOCUMENTS

KR    20200060241 A    5/2020

*Primary Examiner* — Sargon N Nano
(74) *Attorney, Agent, or Firm* — CANTOR COLBURN LLP (57) ABSTRACT

Disclosed are a method and an apparatus for an instant messaging service to provide a schedule service. A schedule management server according to an example embodiment includes receiving a schedule creating request, selecting any one of a first type of calendar belonging to a chatroom in which the schedule creating request is created and a second type of calendar belonging to a user account which creates the schedule creating request, according to a schedule type included in the schedule creating request; and creating a schedule corresponding to the selected type of calendar.

12 Claims, 5 Drawing Sheets

(56) References Cited

U.S. PATENT DOCUMENTS

| | | | | |
|---|---|---|---|---|
| 2016/0156574 A1* | 6/2016 | Hum | ............ | H04L 51/02 |
| | | | | 715/752 |
| 2016/0156584 A1* | 6/2016 | Hum | ............ | G06F 3/0482 |
| | | | | 715/752 |
| 2017/0289074 A1* | 10/2017 | Joo | ............ | H04L 67/52 |
| 2020/0137005 A1* | 4/2020 | Kim | ............ | H04L 51/42 |
| 2021/0264379 A1* | 8/2021 | Kim | ............ | H04L 51/02 |
| 2021/0297371 A1* | 9/2021 | Lee | ............ | H04L 51/18 |
| 2021/0383489 A1* | 12/2021 | Hutchinson | ............ | G06F 16/29 |
| 2022/0237365 A1* | 7/2022 | Goo | ............ | G06F 40/137 |

\* cited by examiner

METHOD FOR INSTANT MESSAGING SERVICE PROVIDING SCHEDULE SERVICE AND APPARATUS THEREOF

TECHNICAL FIELD

Following example embodiments relate to a method for an instant messaging service providing a schedule service and an apparatus thereof.

BACKGROUND ART

The instant messaging service is a message transmitting/receiving service between two or more users using a network and is provided to the users through a client program called an instant messenger. Unlike the existing instant messenger which transmits and receives text messages, instant messengers which support various functions such as a function of transmitting/receiving various types of media files such as photos, videos, and voice files and a data transmitting/receiving function in the unit of a group which is simultaneously communicable with two or more different users are being supplied. Recently, in accordance with the increase of the use of the instant messenger in a user terminal such as a mobile communication terminal or a personal computer (PC), there is a demand to develop various convenient instant messaging service techniques for communication and/or data sharing with other participants who participate in various chatrooms.

DISCLOSURE OF THE INVENTION

Technical Solutions

According to an aspect, an operation method of a schedule management server includes receiving a schedule creating request, selecting any one of a first type of calendar belonging to a chatroom in which the schedule creating request is created and a second type of calendar belonging to a user account which creates the schedule creating request, according to a schedule type included in the schedule creating request; and creating a schedule corresponding to the selected type of calendar. The schedule type may be determined according to a type of chatroom for which a calendar creating request occurs.

The creating of a schedule may include when the selected type of calendar is a first type of calendar, creating a first type of schedule which is shared with a participant of a chatroom in which the schedule creating request is created and belongs to a chatroom in which the schedule creating request is created.

The participant of the chatroom in which the first type of schedule is shared may include a participant who is participating in the chatroom at a moment when the first type of schedule is created and a participant who is participating in the chatroom after creating the first type of schedule.

A notification regarding the first type of schedule may be provided through the chatroom.

The operation method of a schedule management server may further include receiving a request to edit the first type of schedule from the participant of the chatroom; and editing the first type of schedule based on an editing permission of the participant who creates the editing request.

The editing permission may be set by a manager of the chatroom.

The operation method of a schedule management server may further include activating a responding function to whether to attend corresponding to the first type of schedule, based on a setting regarding response reception to whether to attend included in the schedule creating request; and storing participation information of a participant of the chatroom in the first type of schedule, in response to the response to whether to attend corresponding to the first type of schedule received from the participant of the chatroom.

The creating of a schedule may include creating a second type of schedule which is shared with an invitation object to the schedule and belongs to the user account when the selected type of calendar is the second type of calendar.

The operation method of a schedule management server may further include creating the second type of schedule belonging to an account of the invitation object, based on the invitation object included in the schedule creating request.

According to another aspect, an operation method of a schedule management server may include receiving a schedule search request; selecting any one of a first type of calendar belonging to a chatroom in which the schedule is created and a second type of calendar belonging to a user account which creates the schedule, according to a schedule type included in the schedule search request; checking a permission regarding the schedule search request according to the selected type of calendar, and providing contents of the search requested schedule according to the checked permission. The schedule type may be determined according to a type of a chatroom in which the schedule is created.

When the selected type of calendar is a first type of calendar, the checking of a permission regarding a schedule search request may include requesting a messaging server to check whether a user account which creates a schedule search request is a participant of a chatroom in which a schedule is created.

The providing of contents of the search requested schedule may include providing contents of the search requested schedule, when the user account is confirmed to be a participant of the chatroom in which the schedule is created.

When the selected type of calendar is a second type of calendar, the checking of a permission regarding a schedule search request may include checking whether a user account which creates a schedule search request is a participant of the corresponding schedule.

The providing of contents of the search requested schedule may include providing contents of the search requested schedule, when the user account is confirmed to be a participant to the schedule.

The participant of the schedule may include at least one of a user account which creates the schedule, a user account included in an invitation object to the schedule, and a user account responding to attend the schedule.

According to another aspect, a schedule management server may include at least one processor configured to receive a schedule creating request, select any one of a first type of calendar belonging to a chatroom in which the schedule creating request is created and a second type of calendar belonging to a user account which creates the schedule creating request, according to a schedule type included in the schedule creating request; and create a schedule corresponding to the selected type of calendar. The schedule type may be determined according to a type of chatroom for which a calendar creating request occurs.

When the schedule is created, if the selected type of calendar is a first type of calendar, the processor may create a first type of schedule which is shared with a participant of a chatroom in which the schedule creating request is created and belongs to a chatroom in which the schedule creating request is created, and if the selected type of calendar is a second type of calendar, create a second type of schedule which is shared with an invitation object to the schedule and belongs to the user account when the selected type of calendar is the second type of calendar.

According to another aspect, a schedule management server may include at least one processor configured to receive a schedule search request, select any one of a first type of calendar belonging to a chatroom in which the schedule is created and a second type of calendar belonging to a user account which creates the schedule, according to a schedule type included in the schedule search request, check a permission regarding the schedule search request according to the selected type of calendar, and provide contents of the search requested schedule according to the checked permission. The schedule type may be determined according to a type of a chatroom in which the schedule is created.

When the permission regarding the schedule search request is checked, if the selected type of calendar is a first type of calendar, the processor may request a messaging server to check whether a user account which creates the schedule search request is a participant of a chatroom in which the schedule is created, and if the selected type of calendar is a second type of calendar, check whether a user account which creates the schedule search request is a participant of the schedule.

When contents of the search requested schedule are provided, if the selected type of calendar is a first type of calendar, the processor may provide contents of the search requested schedule, when the user account is confirmed to be a participant of the chatroom in which the schedule is created, and if the selected type of calendar is a second type of calendar, provide contents of the search requested schedule, when the user account is confirmed to be a participant of the schedule.

DETAILED DESCRIPTION OF THE EMBODIMENT

Specific structural or functional descriptions for example embodiments are provided for the purpose of illustration only and may be changed in various forms to be implemented. Accordingly, an actually implemented form is not limited only to the specific disclosed example embodiment and the scope of the present specification includes changes, equivalents, or substitutes included in a technical spirit described in the example embodiments.

Even though the terms of first or second are used to describe various components, the terms should be interpreted only to distinguish one component from the other component. For example, a first component may be referred to as a second component, and similarly, a second component may be referred to as a first component.

It should be understood that, when it is described that an element is "connected" to another element, the element may be directly coupled or directly connected to the other element or coupled or connected to the other element through a third element.

A singular form may include a plural form if there is no clearly opposite meaning in the context. In the present specification, it should be understood that terms "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

Hereinafter, example embodiments will be described in detail with reference to the accompanying drawings. In description with reference to accompanying drawings, the same components are denoted by the same reference numerals regardless of the reference numeral and a duplicated description thereof will be omitted.

Figure 1:
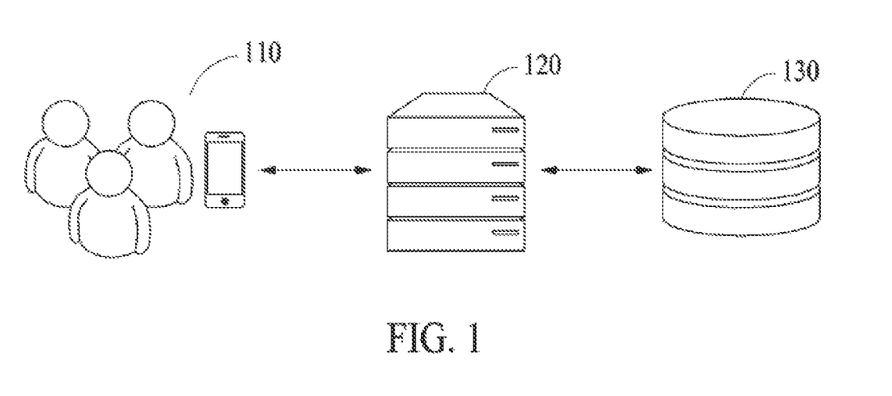
FIG. 1 is a view for explaining an instant messaging system according to an example embodiment.

FIG. 1 is a view for explaining an instant messaging system according to an example embodiment.

Referring to FIG. 1, a system according to an example embodiment includes at least one user terminal 110, a server 120, and a database 130. The user terminal 110 and the server 120 according to the example embodiment may communicate via a network to exchange data and the server 120 may access the database 130 to manage the database 130 to store or acquire data.

The user terminal 110 may include, for example, a personal computer (PC), a net book, a notebook, a personal digital appliance (PDA), a smart phone, a wearable device, and various devices which perform similar functions.

The user terminal 110 may be driven by an installed instant messenger application. The instant messenger application may include an application regarding a social network service having an instant messenger function. The user may use an instant messaging service which is provided by the server 120 through the instant messenger application installed in the user terminal 110. For example, the user subscribes to the instant messaging service through the application installed in the user terminal 110 to create a user account and use the instant messaging service with the created user account.

The server 120 may interwork with the instant messenger application installed in the user terminal 110 for a user interface UI, a function, an operation, or a service. The server 120 may include at least one processor which performs a process for a schedule service and an instant messaging service and a memory which stores data for the schedule service and the instant messaging service.

The instant messaging service may provide a data transmitting/receiving function between user terminals 110 through a chatroom in which the user terminal 110 participates using the user account. In the chatroom, one or more user accounts which subscribe to the instant messaging service may participate and the participants of the chatroom may transmit/receive a message including visual information such as texts, emoticons, or figures and auditory information such as voice with another participant(s) through the chatroom. Further, the participants of the chatroom may transmit receive various types of media files such as photos, videos, and audios through the chatroom.

The schedule service may provide a function for viewing schedules created with regard to the user account of the instant messaging service at a glance. The schedule service allows creating a new schedule during the chatting, searching a created schedule, easily inviting a user account with a friend relationship in the instant messaging service or a user account which is participating in the same chatroom to a specific schedule, or easily transmitting the schedule to the user accounts.

The schedule creation is an operation of requesting the server 120 to create a new schedule corresponding to a calendar and for example, may include an operation of requesting to create a schedule including information such as a title of an event, start date and time, end date and time, a location, and a participant. The calendar is a set of schedule(s) including time information and the schedule may be created so as to correspond to the calendar to be stored or registered in the calendar and a schedule corresponding to a specific calendar may correspond to an instance included in the corresponding calendar.

Schedule search is an operation of identifying contents of the schedule and for example, may include an operation which is provided with detailed information regarding the title of the event, start date and time, end date and time, the location, and the participants from the server 120.

Invitation is an operation of selecting or determining who to accompany on the schedule and for example, may include an operation of selecting or determining who to participate in the schedule, among other user accounts subscribing to the instant messaging service by a user account which creates the schedule or an operation of automatically selecting or determining who to participate in the schedule according to a predetermined policy.

Schedule transmission is an operation of transmitting a schedule to another user account subscribing to the instant messaging service through the chatroom, and for example, may include an operation of transmitting a schedule through a one-to-one chatroom between a user which creates the schedule and the other user account or transmitting a schedule through a group chatroom in which three or more user accounts including a user account which creates a schedule are participating.

In addition, it is possible to check a lunar calendar, holidays, and anniversaries, including birthdays of other users with a friend relationship in the instant messaging service. Further, when access schedules stored in the user terminal 110 in addition to a schedule interworking with the account of the instant messaging service is allowed, the schedules interwork with the account of the instant messaging service to provide the convenience of efficiently managing the schedule.

The server 120 may include a first server which is a schedule management server providing a schedule service and a second server which is a messaging server providing an instant messaging server. The first server and the second server may be implemented on a single server or implemented by separate servers. The first server and the second server interwork to interwork the schedule service and the instant messaging service.

The first server according to the example embodiment may provide various types of calendars. In various types of calendars according to the example embodiment, an object to which the calendar belongs, a permission to create, search, or edit a schedule corresponding to the calendar, an invitation method to a schedule corresponding to the calendar, and a notification method regarding a schedule corresponding to the calendar may be determined in different ways. Here, the schedule edition may include an operation of changing contents included in the schedule or deleting a schedule. For example, depending on a type of the calendar, there may be a calendar belonging to the user account or a calendar belonging to the chatroom.

A schedule type corresponding to a specific calendar may be determined by a type of the corresponding calendar. In other words, a schedule type is a concept corresponding to a type of calendar, and for example, a schedule corresponding to a first type of calendar corresponds to a first type of schedule and a schedule corresponding to a second type of calendar may correspond to a second type of schedule.

When a calendar belongs to an arbitrary object, it means that the calendar is configured in the unit of belonging objects and for example, a calendar belonging to a first object and a calendar belonging to a second object may be configured by different instances. The object to which the calendar belongs may include a user account which subscribes to the instant messaging service, a group of user accounts, and a chatroom created in the instant messaging service.

A schedule corresponding to a specific calendar may belong to an object to which the corresponding calendar belongs. For example, a schedule corresponding to a first calendar belonging to a first user account may belong to the first user account and a schedule corresponding to a second calendar belonging to a first chatroom may belong to the first chatroom. In this case, the schedule corresponding to the second calendar may not be included in a schedule corresponding to the first calendar. In other words, the first calendar and the second calendar may be configured by different instances and a schedule corresponding to the first calendar and a schedule corresponding to the second calendar may be independently created.

The first server according to the example embodiment may basically provide a general calendar to a user account which subscribes to the instant messaging service. The general calendar is a calendar belonging to the user account. The schedule corresponding to the general calendar may be created by a chatroom provided in the instant messaging service. Even though a plurality of schedules created so as to correspond to the general calendar is created through a plurality of different chatrooms, the plurality of schedules may be registered in the general calendar belonging to the user account. Further, a schedule corresponding to the general calendar may be changed or deleted by the belonging user account.

In the schedule corresponding to the general calendar, an invitation object may be specified and the invitation object may be determined based on a chatroom list of the user account which creates a schedule on the instant messaging service and/or a friend list of the user account. At this time, the created schedule is shared with the invitation object and the invitation object may search for the schedule and respond to whether to attend the schedule.

The schedule corresponding to the general calendar may be transmitted to another user through the chatroom and another user account which receives the schedule may search for the contents of the transmitted schedule through the chatroom.

The calendar provided by the first server according to the example embodiment may include a shared calendar. The shared calendar is a calendar which may be used by the participants of the chatroom in the chatroom and may correspond to a calendar which is different from the general calendar which is basically provided.

The shared calendar according to the example embodiment belongs to the chatroom so that it is different from the general calendar which belongs to the user account subscribing to the instant messaging service. Schedule(s) corresponding to the shared calendar is (are) shared by the participants of the chatroom to which the shared calendar belongs and the participants of the chatroom may search for the schedule(s) of the shared calendar belonging through the chatroom.

According to the example embodiment, unlike the schedule corresponding to the general calendar, the schedule corresponding to the shared calendar cannot specify the invitation object. Further, the participants of the chatroom which share the schedule corresponding to the shared calendar may respond to whether to attend according to a schedule for which the responding function to whether to attend is activated. A user account which creates a schedule corresponding to the shared calendar or a user account having a permission to manage a schedule corresponding to the shared calendar may set whether to receive the response to whether to attend the corresponding schedule from another participant and activate or inactivate a function of responding to whether to attend corresponding to the schedule, based on the setting. When the schedule corresponding to the shared calendar is transmitted through a chatroom rather than a chatroom to which the corresponding schedule belongs, a user account other than participants of the chatroom to which the schedule belongs is limited to search for all or a part of the contents of the transmitted schedule. In the meantime, the participant of the chatroom to which the corresponding schedule belongs may search for the contents of the transmitted schedule.

According to the example embodiment, a permission to create and/or edit a schedule of the shared calendar may be given to some of participants according to criteria determined in advance so as to correspond to a chatroom to which the shared calendar belongs. For example, the permission to create and/or edit a schedule corresponding to the shared calendar may be given to a manager of the chatroom to which the shared calendar belongs, or a participant designated by the manager. Details of the shared calendar which is distinguished from the general calendar according to the example embodiment will be described in more detail with reference to FIGS. 2 to 5.

A calendar provided by the first server according to the example embodiment may include various types of calendars as well as the general calendar and the shared calendar. For example, there may be a sub calendar which is additionally available in the user account, a subscription calendar issued from a channel provided by the instant messaging service, a local calendar accessible by the first server or the second server among other calendars stored in the user account 110, a friend birthday calendar including birthdays of friend accounts having a friend relationship with the user account in the instant messaging service, and a Korean anniversary calendar including Korean anniversaries.

The first server according to the example embodiment interworks with the instant messenger application to provide a calendar service UI to the user account 110. The calendar service UI corresponds to a user interface of a schedule management service interworking with the instant messaging service, for example, may select and use a "calendar" sub menu displayed by pressing a specific menu located in a chatroom input window.

For example, in the chatroom of the instant messaging service, a side menu and/or a more-menu to interwork with various functions such as a schedule management function may be provided. The side menu may be a menu which provides additional functions to a side of a screen of the chatroom by selecting a predetermined UI in the chatroom. For example, when a schedule is created through a specific chatroom in which the user account participates, the created schedule and the chatroom may be mapped, and a recent schedule of the user account mapped to the chatroom may be exposed to a side menu of the chatroom. Further, for example, when there is a shared calendar which belongs to a specific chatroom, a recent schedule of the shared calendar may be exposed to a side menu of the corresponding chatroom.

Further, the more-menu may be a menu which provides additional functions in a virtual keyboard area or a pop-up window area by selecting a UI (for example, a "+" button) set in advance in the chatroom. It is possible to access the schedule managing function (a schedule service) through the menus. According to the example embodiment, a schedule with respect to the participants of the chatroom may be created through the more-menu of the chatroom.

The second server according to the example embodiment may provide a schedule notifying service through the chatroom. Schedule notification is an operation of notifying of information regarding the schedule in the form of a message through the chatroom, and for example, may include an operation of providing information informing that a schedule is created, information informing to be invited to the schedule, information informing that a schedule is changed, or information informing a schedule in advance as a message of the chatroom. A chatroom in which information regarding the schedule is provided may include a chatroom in which the user account is participating and a chatroom for an official account for a schedule service. According to the example embodiment, a notification regarding a schedule belonging to a specific chatroom may be provided through the corresponding chatroom and a notification regarding a schedule belonging to the user account may be provided through a chatroom for an official account.

The chatroom for an official account is a chatroom dedicated to an official account provided for every user account and for example, may include an exclusive chatroom for an official account corresponding to the schedule service. The chatroom for the official account may be independently provided to each of the user accounts. For example, even though the first user account and the second user account access the chatroom for the same official account, an instance of an exclusive chatroom provided to the first user account and an instance of an exclusive chatroom provided to the second user account are distinguished from each other.

The official account is a company account which is distinguished from a general personal account subscribing to the instant messaging service or a chatbot and may use a differentiated messaging function which is not provided to a general personal account in the instant messaging service. For example, the official account may transmit information messages or advertising messages to user accounts having a friend relationship (or a subscription relationship) with the corresponding official account. Alternatively, according to an example embodiment, the official account may transmit information messages to at least one user account regardless of the friend relationship.

For example, the user account may receive information messages related to a schedule from the official account corresponding to a schedule service, regardless of whether to be in the friend relationship with the official account corresponding to the schedule service. Thereafter, when the user account has a friend relationship with the official account corresponding to the schedule service, not only the information message, but also the advertising message related to the schedule may be received. According to the example embodiment, the message transmitted from the official account may correspond to a speech balloon which is sent from the official account. According to the example embodiment, the speech balloon in which the official account is a sender may be provided to have a shape which is differentiated from a general word balloon (for example, a system message which may have an exterior appearance differentiated from an exterior appearance of the word balloon and include various types of information).

The official account of the schedule service may change a function, or a setting of the chatroom provided to the user account in various ways. For example, the official account of the schedule service may activate a chatbot function or set to be connected to an adviser through the chatroom and set the UI of the chatroom.

Figure 2:
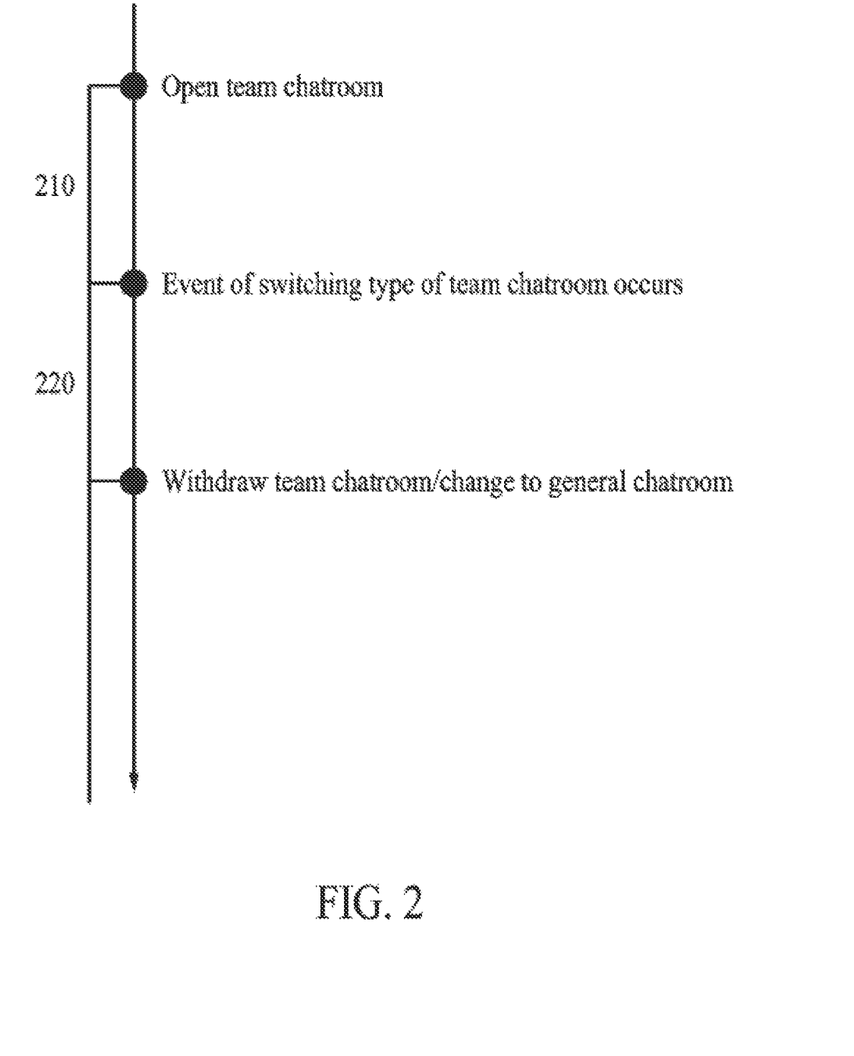
FIG. 2 is a view for explaining a shared calendar belonging to a team chatroom according to an example embodiment.

FIG. 2 is a view for explaining a shared calendar belonging to a team chatroom according to an example embodiment.

According to the example embodiment, a type of a chatroom to which the shared calendar belongs may be limited to a specific type of chatroom. For example, the shared calendar may be created as a calendar belonging to a team chatroom. The team chatroom according to the example embodiment may be a chatroom which provides a function of searching for chatting data before participating in the chatroom, to the participants and correspond to a chatroom distinguished from a general chatroom. According to the example embodiment, the team chatroom may be opened by a user account having a separate permission (for example, a paid member) to open a team chatroom.

Referring to FIG. 2, during periods 210 and 220 in which the team chatroom is maintained, the participant(s) of the team chatroom may use the shared calendar belonging to the team chatroom and schedule(s) created in the team chatroom may correspond to a schedule(s) corresponding to the shared calendar belonging to the team chatroom. The schedule(s) corresponding to the shared calendar may be shared with the participant(s) of the team chatroom and a schedule corresponding to the shared calendar may be shared with a user account which participants in the team chatroom after creating the corresponding schedule. In other words, the participant of the team chatroom may search for a schedule belonging to the team chatroom created before participating.

When a participant in the team chatroom leaves the team chatroom and is no longer a member of the team chatroom, the shared calendar belonging to the team chatroom is no longer available and the schedule(s) belonging to the team chatroom cannot be searched. In the meantime, when the user account which has left the team chatroom participates in the team chatroom again during the periods 210 and 220 in which the team chatroom is maintained, the user account may use the shared calendar belonging to the team chatroom and the schedule(s) corresponding thereto again. According to the example embodiment, when a user participates in a team chatroom during a grace period 220 before withdrawing the team chatroom after an event of switching a type of the team chatroom, usage of the shared calendar belonging to the team chatroom may be partially limited.

A permission to create and/or edit a schedule corresponding to the shared calendar belonging to the team chatroom may be given to at least some of the participants of the team chatroom. In other words, a permission to create and/or edit the schedule corresponding to the shared calendar may be given to all the participants of the team chatroom or limited to some of the participants of the team chatroom. For example, a permission to create and/or edit the schedule may be assigned only to some participants of the team chatroom by a manager of the team chatroom or a user account to which a specific permission regarding the shared calendar belonging to the team chatroom is assigned.

A type of the schedule created in the chatroom of the instant messenger according to the example embodiment may be changed by a state of the chatroom, a state of a user account which is participating in the chatroom, or the like. For example, as a specific type of chatroom is changed to another type of chatroom, a type of a schedule created in the chatroom may be changed.

When an event of switching a type of the team chatroom occurs, the team chatroom is withdrawn after the grace period 220 and a type of the chatroom may be changed into a general chatroom. For example, when the chatroom may be opened in a user account which is a paid member, if a user account which opens the team chatroom or a manager account of the team chatroom is changed from a paid member to a free member, the team chatroom may be changed to a general chatroom after the grace period 220. The change of a host or a manager account of the team chatroom is an example of an event of switching a type of the team chatroom and the event of switching a type of the team chatroom may include various predetermined events.

When the team chatroom is withdrawn and is changed to a general chatroom, the shared calendar is not available in the chatroom and the schedule created in the chatroom corresponds to a schedule corresponding to a general calendar, rather than a schedule corresponding to the shared calendar. In other words, a schedule created in the corresponding chatroom during the periods 210 and 220 in which the team chatroom is maintained corresponds to a schedule corresponding to the shared calendar and a schedule created in the chatroom after the team chatroom is changed to a general chatroom corresponds to a schedule corresponding to the general calendar, for example, a schedule created in the chatroom after the team chatroom is changed to the general chatroom may designate an invitation object and may be registered in the general calendar belonging to each of a user account which creates the schedule and an account of the invitation object to the schedule. At this time, the invitation object is not limited to the participant of the chatroom in which the schedule is created and a permission to search the schedule is also not limited to the participant of the chatroom.

According to the example embodiment, when the team chatroom is changed to the general chatroom, a shared calendar belonging to the team chatroom may be deleted. Deletion of the shared calendar may include deletion of schedule(s) corresponding to the shared calendar.

Even though not illustrated in FIG. 2, the team chatroom may be deleted by a specific condition. For example, the team chatroom may be deleted when all the participants of the team chatroom leave the team chatroom or by a deleting request by a manager of the team chatroom. When the team chatroom is withdrawn, the type of the team chatroom is changed to the general chatroom so that a chatroom in which data is transmitted/received between the participants is maintained. In contrast, when the teach chatroom is deleted, the chatroom itself for transmitting/receiving data between the participants is deleted. When the team chatroom is deleted, the shared calendar belonging to the team chatroom may be deleted so that the chatroom does not exist, and a new schedule cannot be created through the chatroom.

The team chatroom according to the example embodiment is an example of a type of a chatroom to which the shared calendar belongs and the type of chatroom to which the shared calendar belongs may further include a different type of chatroom such as an open chatroom, in addition to the team chatroom.

The open chatroom may correspond to a chatroom in which a user participates through an access path of the chatroom. The host of the open chatroom may share the access path of the open chatroom through other media and a user who receives the access path of the chatroom may participate in the open chatroom through the user account subscribed to the instant messaging service.

According to the example embodiment, a shared calendar belonging to another type of chatroom other than the team chatroom may be created and only the participants of the chatroom may search for a schedule corresponding to the shared calendar by the same principle as the shared calendar belonging to the team chatroom as described above. Further, when the type of the chatroom is changed, the shared calendar belonging to the chatroom may be deleted and the user account which leaves the chatroom may be limited to using the shared calendar belonging to the chatroom so as not to search for a schedule belonging to the chatroom.

Figure 3:
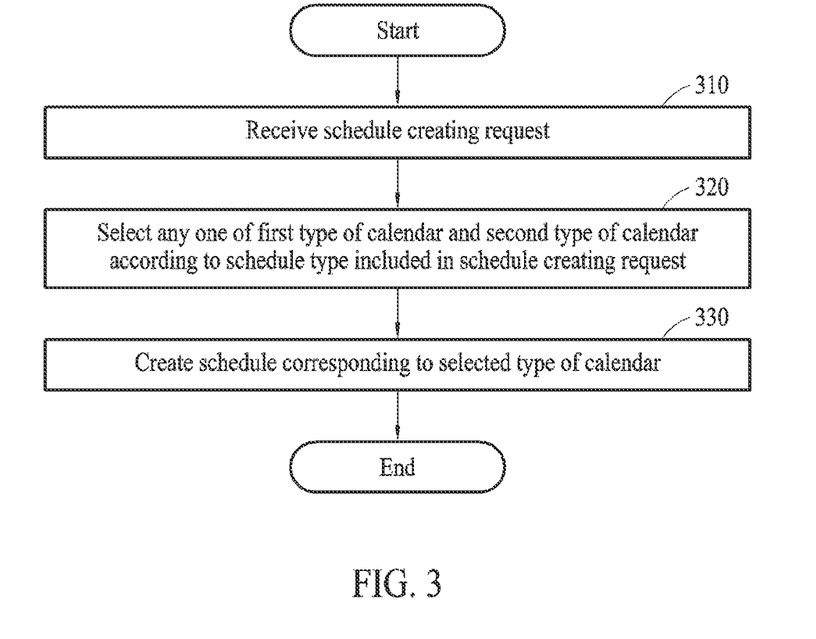
FIG. 3 is a flowchart for explaining an operation method for generating a schedule of a schedule management server according to an example embodiment.

FIG. 3 is a flowchart for explaining an operation method for generating a schedule of a schedule management server according to an example embodiment.

An operation method for creating a schedule of a schedule management server according to an example embodiment may include a step 310 of receiving a schedule creating request from a messaging server or a user terminal, a step 320 of selecting any one of a first type of calendar and a second type of calendar according to a schedule type included in the schedule creating request, and a step 330 of creating a schedule corresponding to a selected type of calendar. The schedule type may be determined according to a type of chatroom in which a schedule creating request occurs. When a schedule creating request occurs in the first type of chatroom (for example, a team chatroom), the schedule type may be determined as a first type corresponding to the shared calendar and when a schedule creating request occurs in the second type of chatroom (for example, a general chatroom), the schedule type may be determined as a second type corresponding to the general calendar.

Here, the first type of calendar is a calendar which stores a schedule created through the first type of chatroom and for example, may be implemented as a shared calendar belonging to a chatroom in which a schedule creating request is created. The second type of calendar is a calendar which stores a schedule created through the second type of chatroom and for example, may be implemented as a general calendar belonging to a user account which creates a schedule creating request.

The schedule creating request received from the messaging server according to the example embodiment may include information for creating a schedule. For example, the schedule creating request may include a schedule type and identification information of a calendar corresponding to the schedule. The schedule type included in the schedule creating request corresponds to a type of calendar in which a requested schedule is registered and may be determined based on which type of calendar the user account requests to create the schedule in response to. For example, when the user account requests to create a schedule corresponding to the shared calendar which is a first type of calendar, the schedule type may be determined as a first type corresponding to the shared calendar and when the user account requests to create a schedule corresponding to a general calendar which is a second type of calendar, the schedule type may be determined as a second type corresponding to the general calendar.

The schedule management server according to the example embodiment may select a calendar corresponding to a schedule to be created according to the schedule type included in the received schedule creating request. For example, when the schedule type included in the schedule creating request corresponds to a type of the shared calendar, the schedule management server may select the shared calendar and when the schedule type corresponds to a general calendar, the schedule management server may select a general calendar.

When the selected type of calendar is a first type of calendar, the step 330 of creating a schedule corresponding to a selected type of calendar according to the example embodiment may include a step of creating a first type of schedule which is shared with a participant of a chatroom in which the schedule creating request is generated and belongs to a chatroom in which the schedule creating request is generated. At this time, a participant of the chatroom in which the schedule creating request is generated and the first type of schedule is shared may include not only a participant who is participating in the chatroom at a moment when the first type of schedule is created, but also a participant who is participating in the chatroom after creating the first type of schedule. In other words, regardless of the chatroom participating time, the participant of the chatroom may share a schedule corresponding to the shared calendar belonging to the chatroom.

The schedule creating request corresponding to the first type of calendar may include a setting to receive a response to whether to attend. The user account which creates the schedule creating request may set whether to receive a response to whether to attend, corresponding to the first type of schedule. When it is set to receive the response to whether to attend corresponding to the schedule according to the schedule creating request, the schedule management server may activate a responding function to whether to attend corresponding to the corresponding schedule. In the meantime, when it is set not to receive the response to whether to attend corresponding to the schedule, the schedule management server may inactivate a responding function to whether to attend in response to the corresponding schedule.

When the function of responding to whether to attend corresponding to the first type of schedule is activated, the participant of the chatroom to which the first type of schedule belongs may respond to whether to attend in response to the schedule. The schedule management server according to the example embodiment may store participation information of the participant of the chatroom in the first type of schedule in response to the response to whether to attend in response to the first type of schedule received from the participant of the chatroom. The participation information may include information regarding whether to attend corresponding to each of the participants of the chatroom.

In the meantime, when the selected type of calendar is a second type of calendar, the method may further include a step of creating a second type of schedule which is shared with an invitation object to the schedule and belongs to the user account which creates the schedule creating request. In this case, the schedule creating request may include at least one invitation object designated by the user account which creates the schedule creating request. For example, the schedule creating request may include a list in which messenger IDs of the invitation objects are stored. According to the example embodiment, a function of responding to whether to attend corresponding to the second type of schedule is activated and a user account included in the invitation object may respond to whether to attend in response to the second type of schedule. According to the example embodiment, the user account which creates the schedule creating request may not set whether to receive a response to whether to attend, in response to the second type of schedule.

Figure 4A:
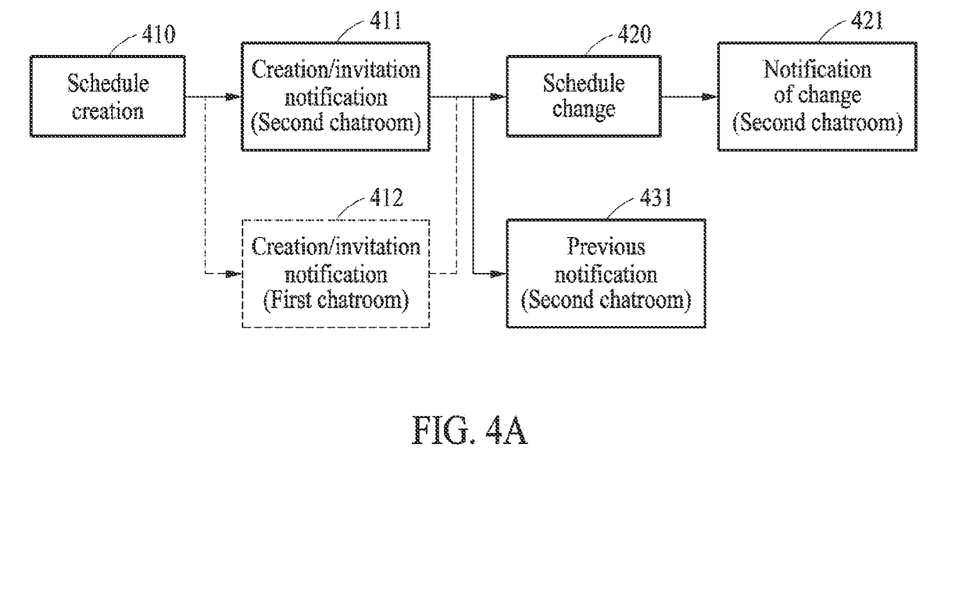
FIGS. 4A and 4B are views for explaining a notification operation regarding a schedule based on a calendar type according to an example embodiment.
Figure 4B:
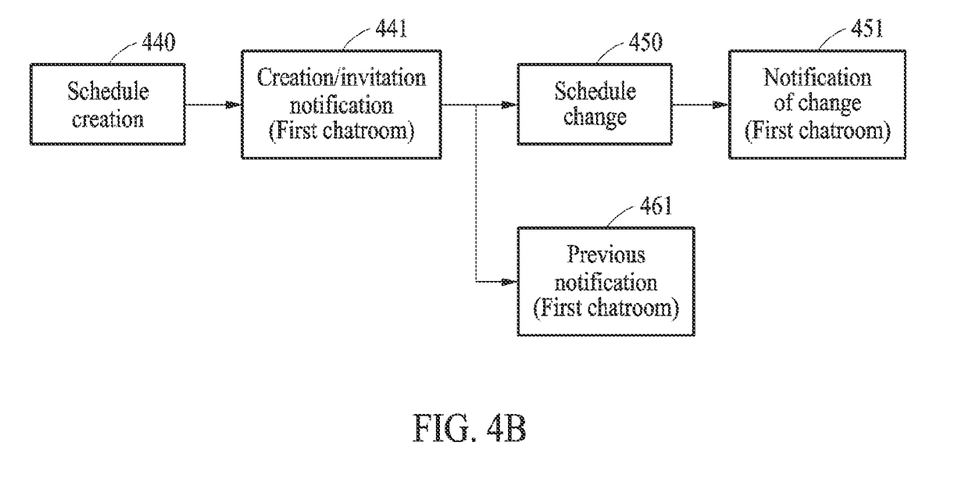

FIGS. 4A and 4B are views for explaining a notification operation regarding a schedule based on a calendar type according to an example embodiment. To be more specific, FIG. 4A is a view for explaining a notification operation regarding a schedule corresponding to a general calendar according to an example embodiment and FIG. 4B is a view for explaining a notification operation regarding a schedule corresponding to a shared calendar according to an example embodiment.

A first chatroom in FIG. 4A refers to a chatroom in which a schedule creating request of the corresponding schedule is created and a second chatroom in FIG. 4A refers to a chatroom for an official account regarding a schedule service.

Referring to FIG. 4A, the messaging server according to an example embodiment may provide a notification 411 regarding schedule creation and/or invitation through the second chatroom, in response to the schedule creation 410 corresponding to the general calendar. The notification 411 regarding the schedule creation may be provided through the second chatroom corresponding to a user account which creates a schedule in the form of a message and the notification 411 regarding the schedule invitation may be provided through the second chatroom corresponding to a user account which is an invitation object to the schedule in the form of the message.

According to the example embodiment, the notification 412 regarding the creation and/or invitation of the schedule corresponding to the general calendar may be provided not only through the second chatroom, but also through the first chatroom, in the form of a message. For example, when it is requested to create a schedule corresponding to the general calendar through a chatroom in which a user account which creates a schedule and at least some of the user accounts included in the invitation object are participating, the notification 412 regarding the creation and/or invitation of the schedule may be provided through the chatroom.

When a schedule corresponding to the general calendar is changed (420) by a user account which creates a schedule or a user account included in the invitation object, the messaging server according to the example embodiment may provide a notification 421 regarding the schedule change through the second chatroom in response to the schedule change 420. The notification 421 regarding the schedule change may be provided to the user account which creates a schedule and a user account included in the invitation object through the second chatroom in the form of a message.

When a previous notification by the user account is set to the schedule according to the example embodiment, the server may provide previous notification 431 regarding the schedule through the second chatroom corresponding to the user account based on this. According to the example embodiment, a previous notification 431 may be provided to the user account included in the invitation object through a second chatroom based on a setting of the user account which creates a schedule and the previous notification 431 may be provided to the user account through the second chatroom based on the setting of the user account included in the invitation object.

In FIG. 4B, the first chatroom may refer to a chatroom in which a schedule creating request of the corresponding schedule is created and refer to a chatroom to which a shared calendar belongs.

Referring to FIG. 4B, the messaging server according to the example embodiment may provide a notification 441 regarding schedule creation through the first chatroom, in response to the schedule creation 440 corresponding to the shared calendar.

When the schedule corresponding to the shared calendar is changed (450) by a participant of a chatroom to which the shared calendar belongs, the messaging server according to the example embodiment may provide a notification 451 regarding the schedule creation through the first chatroom in response to the schedule change 450.

When a previous notification is set to a schedule corresponding to the shared calendar by a participant of the chatroom to which the shared calendar belongs, the messaging server according to the example embodiment may provide a previous notification 461 regarding the schedule through the first chatroom based on the set previous notification.

According to the example embodiment, the notifications 441, 451, and 461 regarding the shared calendar may not be provided through the second chatroom for an official account regarding a schedule service, unlike a notification regarding the general calendar.

Figure 5:
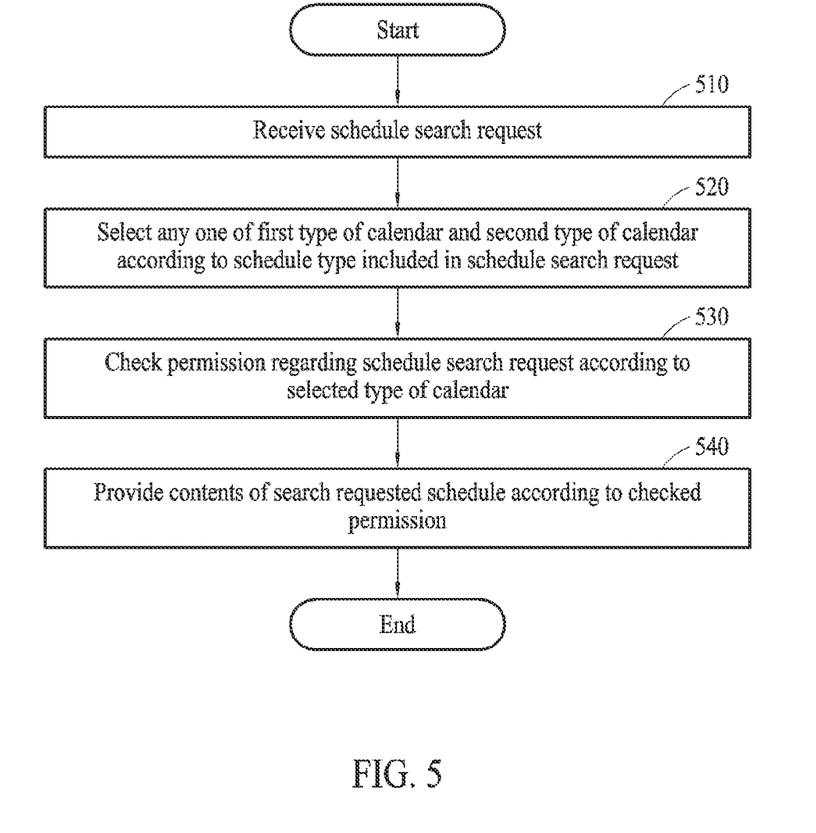
FIG. 5 is a flowchart for explaining an operation method for a schedule search request of a schedule management server according to an example embodiment.

FIG. 5 is a flowchart for explaining an operation method for a schedule search request of a schedule management server according to an example embodiment.

An operation method for a schedule search request of a schedule management server according to an example embodiment may include a step 510 of receiving a schedule search request from a messaging server or a user terminal, a step 520 of selecting any one of a first type of calendar and a second type of calendar according to a schedule type included in the schedule search request, a step 530 of checking a permission regarding a schedule search request according to the selected type of calendar, and a step 540 of providing contents of a search requested schedule according to the checked permission. Here, a first type of calendar may correspond to a shared calendar belonging to a chatroom in which a schedule creating request is created and a second type of calendar may correspond to a general calendar belonging to a user account which creates a schedule creating request.

According to the example embodiment, when the selected type of calendar is a first type of calendar, the step 130 of checking a permission regarding a schedule search request may include a step of requesting a messaging server to check whether a user account which creates a schedule search request is a participant of a chatroom in which a schedule is created. The messaging server according to the example embodiment accesses to information of a chatroom created in the instant messaging service and information of a user account which is participating in the chatroom so that the messaging server may check whether the user account which creates a schedule search request is a participant of a chatroom in which the schedule is created and provide a result to the schedule management server. When it is confirmed that the user account which creates a schedule search request is a participant of the chatroom in which the schedule is created, the schedule management server may determine that the corresponding user account has a schedule search permission and provide contents of the search requested schedule to the corresponding user account.

According to the example embodiment, when the selected type of calendar is a second type of calendar, the step 130 of checking a permission regarding a schedule search request may include a step of checking whether a user account which creates a schedule search request is a participant of the corresponding schedule. Here, the participant of the corresponding schedule may include a user account which creates the corresponding schedule and a user account included in an invitation object to the corresponding schedule. According to the example embodiment, the participant of the corresponding schedule may include a user account which responds to attend the corresponding schedule. When it is confirmed that a user account which creates a schedule search request is a participant of the corresponding schedule, the schedule management server may determine that the corresponding user account has a schedule search permission and provide contents of the search requested schedule to the corresponding user account.

According to the example embodiment, a schedule corresponding to the shared calendar may be transmitted to another user account through another chatroom, other than a chatroom to which the shared calendar belongs, by the participant of the chatroom to which the shared calendar belongs. A participant of another chatroom to which the schedule is transmitted may request the schedule management server to search for a transmitted schedule through the chatroom. The schedule management server which receives a search request of the transmitted schedule may provide the contents of the schedule requested to be searched to the user account based on whether the user account which requests to search for the transmitted schedule is a participant of the chatroom to which the shared calendar belongs. The schedule management server may request the messaging server to check whether the user account which requests to search for the transmitted schedule is a participant of the chatroom to which the shared calendar belongs. When the user account which creates a search request is a participant of the chatroom in which the shared schedule is created, as a checking result, the schedule management server may determine that the corresponding user account has a schedule search permission and provide contents of the search requested schedule to the corresponding user account. In the meantime, when it is confirmed that the user account is not a participant of the chatroom to which the shared calendar belongs, the server may not provide the contents of the search requested schedule.

For example, when the first user account and the second user account participate in a chatroom to which a schedule corresponding to the shared calendar is transmitted, the first user account corresponds to a participant of a chatroom to which the shared calendar belongs and the second user account does not correspond to a participant of a chatroom to which the shared calendar belongs, the first user account may search for a schedule transmitted through the corresponding chatroom and the second user account may not search for the transmitted schedule.

The example embodiments described above may be implemented by a hardware component, a software component, and/or a combination of the hardware component and the software component. For example, the device, the method, and the components described in the example embodiments may be implemented, for example, using a general purpose computer or a special purpose computer such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and a software application which is executed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of processing element. For example, the processing device may include a plurality of processors or include one processor and one controller. Further, another processing configuration such as a parallel processor may be allowed.

The software may include a computer program, a code, an instruction, or a combination of one or more of them and configure the processing device to be operated as desired or independently or collectively command the processing device. The software and/or data may be permanently or temporarily embodied in an arbitrary type of machine, component, physical device, virtual equipment, computer storage medium, or device, or signal wave to be transmitted to be interpreted by a processing device or provide command or data to the processing device. The software may be distributed on a computer system connected through a network to be stored or executed in a distributed manner. The software and data may be stored in a computer readable recording medium.

The method according to the example embodiment may be implemented as a program instruction which may be executed by various computers to be recorded in a computer readable medium. The computer readable medium may store the program instruction, a data file, or a data structure alone or in combination and the program instruction stored in the medium may be specifically designed and configured for the example embodiment or known to be available to those skilled in the art of computer software. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program instruction such as a ROM, a RAM, and a flash memory. Examples of the program instruction include not only a machine language code which is created by a compiler but also a high level language code which may be executed by a computer using an interpreter.

The above-described hardware device may operate as one or a plurality of software modules in order to perform the operation of the example embodiment and vice versa.

As described above, although example embodiments have been described by limited drawings, those skilled in the art may apply various technical modifications and changes based on the above description. For example, even when the above-described techniques are performed by different order from the described method and/or components such as systems, structures, devices, or circuits described above are coupled or combined in a different manner from the described method or replaced or substituted with other components or equivalents, the appropriate results can be achieved.

Therefore, other implements, other example embodiments, and equivalents to the claims are within the scope of the following claims.

What is claimed is:

1. An operation method of a schedule management server, comprising:
receiving a schedule creating request generated through a chatroom;
determining a schedule type corresponding to the schedule creating request, based on a type of the chatroom;
selecting a type of calendar corresponding to the schedule type from among a first type of calendar belonging to the chatroom in which the schedule creating request is created and a second type of calendar belonging to a user account which creates the schedule creating request; and
creating a schedule corresponding to the selected type of calendar, based on the schedule creating request,
wherein creating the schedule comprises:
when the selected type of calendar is the first type of calendar, generating a first type of schedule instance configured such that accessing a content of the first type of the schedule instance is gated via participation in the chatroom; and
when the selected type of calendar is the second type of calendar, generating a second type of schedule instance configured such that accessing a content of the second type of the schedule instance is gated via being included in an invitation object of the second type of schedule instance;
wherein the schedule corresponding to the selected type of calendar includes an instance of the schedule being registered in the selected type of calendar.

2. The operation method of claim 1, wherein the creating of a schedule includes:
when the selected type of calendar is the first type of calendar, creating a first type of schedule which is shared with a participant of a chatroom in which the schedule creating request is created and belongs to a chatroom in which the schedule creating request is created.

3. The operation method of claim 2, wherein the participant of the chatroom in which the first type of schedule is shared includes a participant who is participating in the chatroom at a moment when the first type of schedule is created and a participant who is participating in the chatroom after creating the first type of schedule.

4. The operation method of claim 2, wherein a notification regarding the first type of schedule is provided through the chatroom.

5. The operation method of claim 2, further comprising:
receiving a request to edit the first type of schedule from the participant of the chatroom; and
editing the first type of schedule based on an editing permission of the participant who creates the editing request.

6. The operation method of claim 5, wherein the editing permission is set by a manager of the chatroom.

7. The operation method of claim 2, further comprising:
activating a responding function to whether to attend corresponding to the first type of schedule, based on a setting regarding response reception to whether to attend included in the schedule creating request; and
storing participation information of a participant of the chatroom in the first type of schedule, in response to the response to whether to attend corresponding to the first type of schedule received from the participant of the chatroom.

8. The operation method of claim 1, wherein the creating of a schedule includes:
creating a second type of schedule which is shared with an invitation object to the schedule and belongs to the user account when the selected type of calendar is the second type of calendar.

9. The operation method of claim 8, further comprising:
creating the second type of schedule belonging to an account of the invitation object, based on the invitation object included in the schedule creating request.

10. A non-transitory computer program which is coupled to hardware to be stored in a non-transitory medium to execute the method of claim 1.

11. A schedule management server, comprising:
at least one processor configured to receive a schedule creating request generated through a chatroom, determine a schedule type corresponding to the schedule creating request, based on a type of the chatroom, select a type of calendar corresponding to the schedule type from among a first type of calendar belonging to a chatroom in which the schedule creating request is created and a second type of calendar belonging to a user account which creates the schedule creating request, and create a schedule corresponding to the selected type of calendar, based on the schedule creating request,
wherein creating the schedule comprises:
when the selected type of calendar is the first type of calendar, generating a first type of schedule instance configured such that accessing a content of the first type of the schedule instance is gated via participation in the chatroom, and
when the selected type of calendar is the second type of calendar, generating a second type of schedule instance configured such that accessing a content of the second type of the schedule instance is gated via being included in an invitation object of the second type of schedule instance,
wherein the schedule corresponding to the selected type of calendar includes an instance of the schedule being registered in the selected type of calendar.

12. The schedule management server of claim 11, wherein when the schedule is created, the processor creates a first type of schedule which is shared with a participant of a chatroom in which the schedule creating request is created and belongs to a chatroom in which the schedule creating request is created, when the selected type of calendar is the first type of calendar, and creates a second type of schedule which is shared with an invitation object to the schedule and belongs to the user account when the selected type of calendar is the second type of calendar.

* * * * *